United States Patent
Tomioka

(10) Patent No.: US 7,933,075 B2
(45) Date of Patent: Apr. 26, 2011

(54) VARIABLE-POWER OPTICAL SYSTEM AND IMAGING APPARATUS

(75) Inventor: Ukyo Tomioka, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 130 days.

(21) Appl. No.: 12/483,381

(22) Filed: Jun. 12, 2009

(65) Prior Publication Data

US 2009/0323199 A1    Dec. 31, 2009

(30) Foreign Application Priority Data

Jun. 30, 2008    (JP) ................ P2008-170863

(51) Int. Cl.
*G02B 15/14*    (2006.01)
(52) U.S. Cl. ................. 359/691; 359/676
(58) Field of Classification Search .......... 359/691, 359/680–682, 676
See application file for complete search history.

(56) References Cited

U.S. PATENT DOCUMENTS

| 4,925,280 | A * | 5/1990 | Hashimoto | .......... 359/691 |
| 6,943,958 | B2 * | 9/2005 | Ozaki et al. | .......... 359/680 |
| 7,046,454 | B2 | 5/2006 | Tomioka | |
| 7,050,240 | B2 | 5/2006 | Tomioka | |

FOREIGN PATENT DOCUMENTS

| JP | 4-163512 | | 6/1992 |
| JP | 2004-317901 | A | 11/2004 |
| JP | 2005-62770 | A | 3/2005 |
| JP | 2005-99758 | A | 4/2005 |
| JP | 2005-134887 | A | 5/2005 |
| JP | 2006-91643 | A | 4/2006 |
| JP | 2006-119574 | A | 5/2006 |
| JP | 2007-94174 | A | 4/2007 |
| JP | 2008-65051 | A | 3/2008 |

OTHER PUBLICATIONS

European Patent Office, Office Action, Aug. 18, 2010.

* cited by examiner

*Primary Examiner* — Joseph Martinez
*Assistant Examiner* — James R Greece
(74) *Attorney, Agent, or Firm* — Birch, Stewart, Kolasch & Birch, LLP

(57) ABSTRACT

The variable-power optical system is provided and includes a first lens group having a negative refractive power, a stop, and a second lens group having a positive refractive power, in order from an object side. The first lens group includes a first sub lens group having three negative meniscus lenses and a second sub lens group having a biconcave lens and a positive lens, in order from the object side. The second lens group includes a first positive lens arranged closest to the object side and having at least one aspheric surface and a second positive lens arranged immediately after the image side of the first positive lens. When the absolute value of the focal length of the first lens group is $|f1|$ and the focal length of the entire system at a wide angle end is fw, the Conditional expression: $1.9 < |f1|/fw < 3.6$ is satisfied.

9 Claims, 13 Drawing Sheets

WIDE

TELE

WIDE
Fno.=1.33
— LINE d
--- LINE g
···· LINE C
-20μm  20μmm
SPHERICAL
ABERRATION

ω=73.9°
— SAGITTAL
--- TANGENTIAL
-20μm  20μm
ASTIGMATISM

ω=73.9°
-50%  50%
DISTORTION

TELE
Fno.=2.59
— LINE d
--- LINE g
···· LINE C
-20μm  20μm
SPHERICAL
ABERRATION

ω=28.3°
— SAGITTAL
--- TANGENTIAL
-20μm  20μm
ASTIGMATISM

ω=28.3°
-50%  50%
DISTORTION

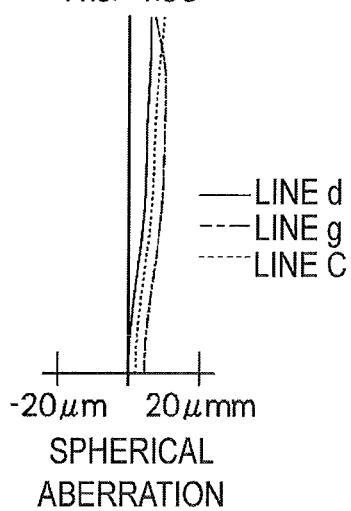
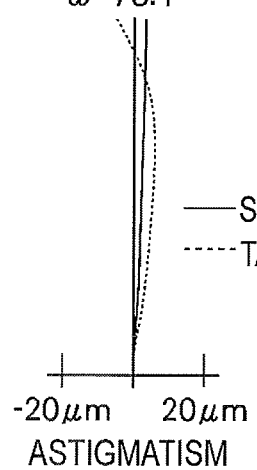
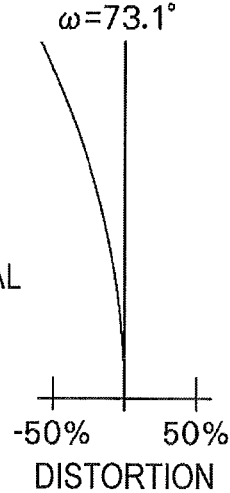
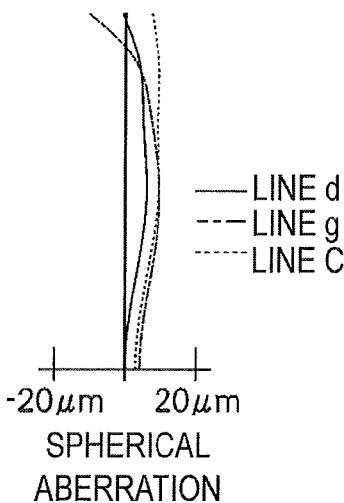
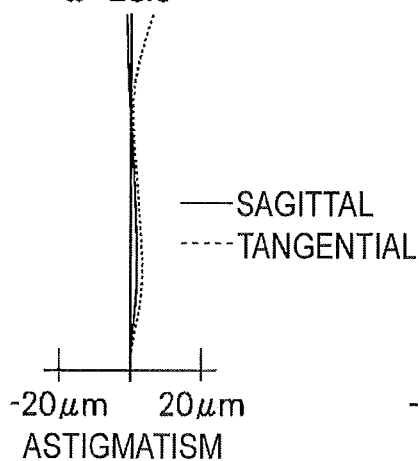
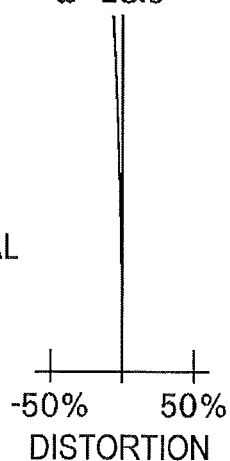

WIDE
Fno.=1.33

—— LINE d
--- LINE g
····· LINE C

-20μm  20μmm
SPHERICAL
ABERRATION

ω=73.1°

—— SAGITTAL
---- TANGENTIAL

-20μm  20μm
ASTIGMATISM

ω=73.1°

-50%  50%
DISTORTION

TELE
Fno.=2.09

—— LINE d
--- LINE g
····· LINE C

-20μm  20μm
SPHERICAL
ABERRATION

ω=28.9°

—— SAGITTAL
---- TANGENTIAL

-20μm  20μm
ASTIGMATISM

ω=28.9°

-50%  50%
DISTORTION

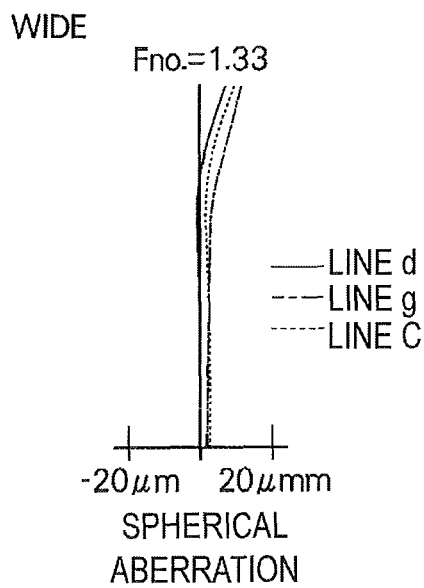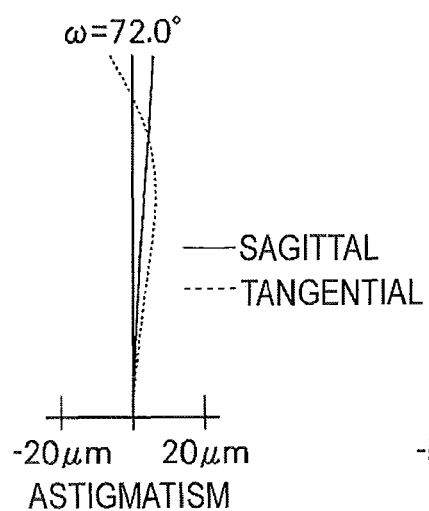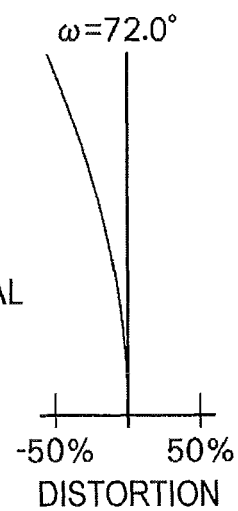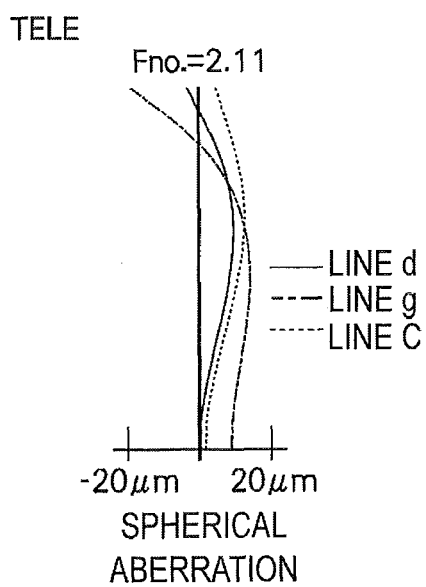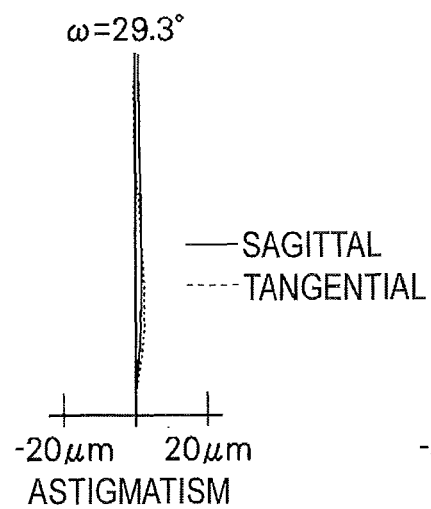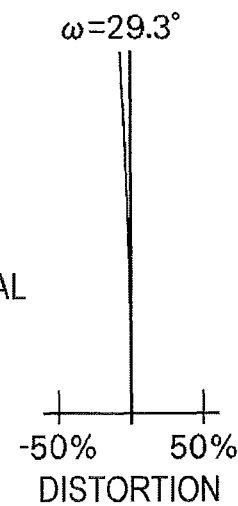

WIDE Fno.=1.78

-20μm 20μmm
SPHERICAL ABERRATION

— LINE d
--- LINE g
----- LINE C

ω=72.4°

-20μm 20μm
ASTIGMATISM

— SAGITTAL
----- TANGENTIAL

ω=72.4°

-50% 50%
DISTORTION

TELE Fno.=2.97

-20μm 20μm
SPHERICAL ABERRATION

— LINE d
--- LINE g
----- LINE C

ω=28.8°

-20μm 20μm
ASTIGMATISM

— SAGITTAL
----- TANGENTIAL

ω=28.8°

-50% 50%
DISTORTION

VARIABLE-POWER OPTICAL SYSTEM AND IMAGING APPARATUS

This application is based on and claims priority under 35 U.S.C §119 from Japanese Patent Application No. 2008-170863 filed on Jun. 30, 2008, the entire disclosure of which is herein incorporated by reference.

BACKGROUND OF THE INVENTION

1. Field of the Invention

The present invention relates to a variable-power optical system used for, for example, a video camera or an electronic still camera and an imaging apparatus, and more particularly, to a variable-power optical system suitable to be used for a monitoring camera and an imaging apparatus including the variable-power optical system.

2. Description of the Related Art

Monitoring cameras have been used to operate unmanned facilities. In recent years, particularly, there is an increasing demand for monitoring cameras capable of changing power. A fast optical system having a large aperture ratio needs to be used as a variable-power optical system for the monitoring camera such that it can specify a subject even under low-brightness imaging conditions. In addition, an optical system applied to the monitoring camera needs to have a compact structure and a high optical performance.

For example, JP-A-2006-119574 and JP-A-2007-94174 disclose variable-power optical systems that have a large aperture ratio, a small size, and a high optical performance and can be mounted to the monitoring camera. JP-A-2006-119574 discloses an optical system that includes a first negative lens group, an aperture diaphragm, and a second positive lens group arranged in this order from an object side. In the optical system, the first group includes three single lenses, that is, two negative lenses and one positive lens. JP-A-2007-94174 discloses an optical system that includes a first negative lens group and a second positive lens group arranged in this order from an object side. In the optical system, the second group includes an aperture diaphragm, and a cemented lens of a negative meniscus lens and a positive lens is arranged closest to the object side in the second group.

However, the optical system for the monitoring camera needs to have a wide angle of view in order to monitor a wide range. In addition, in recent years, there is an increasing demand for a monitoring camera capable of obtaining a high-quality image. Therefore, there is an increasing demand for a variable-power optical system capable of corresponding to a camera including an imaging device provided with 1,000,000 pixels or more. However, in the optical system according to the related art, it is difficult to achieve an optical performance capable of corresponding to an increase in the number of pixels while maintaining a large aperture ratio required for the monitoring camera and obtaining a wide angle of view.

SUMMARY OF THE INVENTION

The invention has been made in order to solve the above-mentioned problems, and it is an object of the invention to provide a variable-power optical system that has a small size, a large aperture ratio, a wide angle of view, and a high optical performance capable of obtaining a high-quality image, and an imaging apparatus including the variable-power optical system.

According to an aspect of the invention, a variable-power optical system includes a first lens group having a negative refractive power, a stop, and a second lens group having a positive refractive power arranged in this order from an object side. A gap between the first lens group and the second lens group on an optical axis is changed to vary power. The first lens group is moved along the optical axis to correct the position of an imaging surface after the variation in power. The first lens group includes a first sub lens group having three negative meniscus lenses and a second sub lens group having a biconcave lens and a positive lens arranged in this order from the object side. The second lens group includes a first positive lens that is arranged closest to the object side and has at least one aspheric surface and a second positive lens that is arranged immediately after the image side of the first positive lens. When the absolute value of the focal length of the first lens group is |f1| and the focal length of the entire system at a wide angle end is fw, the variable-power optical system satisfies Conditional expression 1 given below:

$$1.9 < |f1|/fw < 3.6. \quad \text{[Conditional expression 1]}$$

Here, 'the second positive lens arranged immediately after the image side of the first positive lens' does not mean the distance relationship between the first positive lens and the second positive lens, but means that there is no optical component with power between the first positive lens and the second positive lens.

In the variable-power optical system according to the above-mentioned aspect, since the first sub lens group including at least three negative meniscus lenses is arranged close to the object side, it is possible to achieve a wide angle of view while preventing distortion. In addition, since an aspheric lens is arranged closest to the object side lens in the second lens group, it is easy to correct spherical aberration that tends to increase with an increase in aperture ratio. Therefore, it is easy to achieve a large aperture ratio. Further, since the aspheric lens makes it easy to correct aberrations other than the spherical aberration, it is easy to obtain a high optical performance while reducing the size of an optical system. Furthermore, since the variable-power optical system according to the above-mentioned aspect satisfies Conditional expression 1, it is possible to maintain the power ratio of the first lens group to the entire optical system within an appropriate range. Therefore, it is possible to prevent the spherical aberration at a telephoto end while reducing the size of an optical system. As a result, it is possible to achieve an optical system that has a large aperture ratio and is capable of a high-quality image.

In the variable-power optical system according to the above-mentioned aspect, when the average of the refractive indexes of all the negative meniscus lenses included in the first sub lens group at the d-line is N1$m$, the variable-power optical system may satisfy Conditional expression 2 given below:

$$N1m > 1.70. \quad \text{[Conditional expression 2]}$$

In the variable-power optical system according to the above-mentioned aspect, when the Abbe number of the positive lens included in the second sub lens group at the d-line is ν2$p$, at least one of the positive lenses may satisfy Conditional expression 3 given below:

$$\nu 2p < 20.0. \quad \text{[Conditional expression 3]}$$

In the variable-power optical system according to the above-mentioned aspect, the first lens group may include five single lenses, that is, three negative meniscus lenses, a biconcave lens, and a positive lens arranged in this order from the object side.

In the variable-power optical system according to the above-mentioned aspect, the second lens group may include four lenses, that is, the first positive lens, which is a biconvex lens, the second positive lens, which is a biconvex lens, a negative meniscus lens having a concave surface facing an image side, and a biconvex lens arranged in this order from the object side.

In the variable-power optical system according to the above-mentioned aspect, when the refractive index of the negative meniscus lens of the second lens group at the d-line is N23, the variable-power optical system may satisfy Conditional expression 4 given below:

$$N23 > 1.95. \qquad \text{[Conditional expression 4]}$$

The variable-power optical system according to the above-mentioned aspect may further include a third lens group that has a negative refractive power, is provided on the image side of the second lens group, and is fixed when power varies.

In the variable-power optical system according to the above-mentioned aspect, at least one of the negative meniscus lenses included in the first sub lens group may have at least one aspheric surface.

According to another aspect of the invention, an imaging apparatus includes the variable-power optical system.

According to the variable-power optical system of the invention, a first lens group having a negative refractive power, an aperture diaphragm, and a second lens group having a positive refractive power are arranged in this order from the object side. The first lens group includes at least three negative meniscus lenses arranged close to the object side, and an aspheric lens is arranged closest to the object side in the second lens group. The structure of each lens group is appropriately set so as to satisfy Conditional expression 1. Therefore, it is possible to achieve an optical system that has a small size, a large aperture ratio, a wide angle of view, and a high optical performance capable of obtaining a high-quality image.

An imaging apparatus according to the invention includes the variable-power optical system according to the invention. Therefore, the imaging apparatus has a small size and a wide angle of view, and can capture a high-quality image even under low-brightness imaging conditions.

BRIEF DESCRIPTION OF THE DRAWINGS

FIGS. 9A to 9F are diagrams illustrating aberrations of the variable-power optical system according to Example 3 of the invention;

FIGS. 11A to 11F are diagrams illustrating aberrations of the variable-power optical system according to Example 5 of the invention;

DESCRIPTION OF THE PREFERRED EMBODIMENTS

Hereinafter, exemplary embodiments of the invention will be described in detail with reference to the accompanying drawings.

Figure 1:
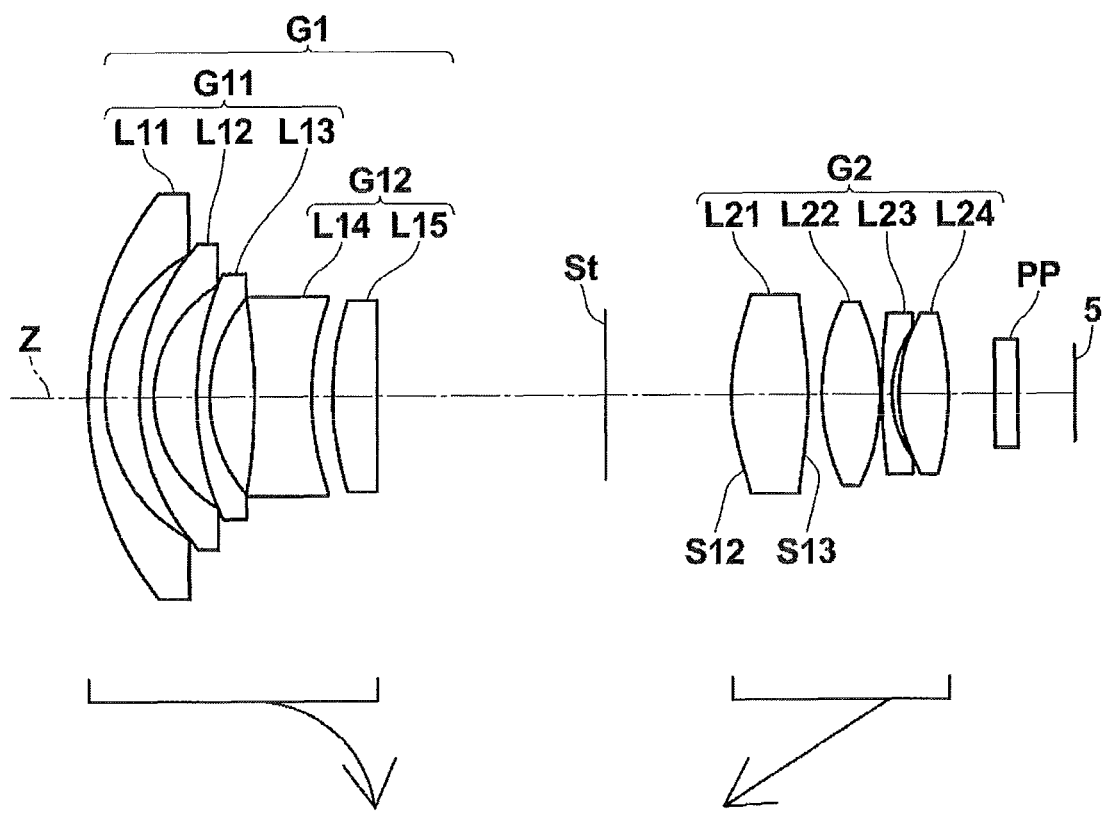
FIG. 1 is a cross-sectional view illustrating the structure of lenses of a variable-power optical system according to Example 1 of the invention.

FIG. 1 is a cross-sectional view illustrating the structure of a variable-power optical system according to an embodiment of the invention. The structure shown in FIG. 1 corresponds to a variable-power optical system according to Example 1, which will be described below. In FIG. 1, the left side is an object side, and the right side is an image side. FIG. 1 shows the arrangement of lenses at a wide angle end during infinity focusing. In FIG. 1, the movement locus of each lens group when power varies from a wide angle end to a telephoto end is schematically shown below the arrangement, which is represented by an arrow.

The variable-power optical system includes a first lens group G1 having a negative refractive power, an aperture stop St, and a second lens group G2 having a positive refractive power arranged in this order from the object side along an optical axis Z. Such a structure having a lens with negative power at its head is suitable to obtain a wide angle of view, and can relatively easily ensure back focus.

The aperture stop St shown in FIG. 1 does not necessarily indicate a size or a shape, but indicates a position on the optical axis Z.

In FIG. 1, an imaging device 5 provided on an imaging surface of the variable-power optical system is also shown, considering a case in which the variable-power optical system is applied to an imaging apparatus. The imaging device 5 is for capturing the image of a subject formed by the variable-power optical system, and the imaging device 5 is arranged such that an imaging surface thereof is disposed on an image forming surface of the variable-power optical system.

When the variable-power optical system is applied to an imaging apparatus, it is preferable that, for example, cover glass or various filters, such as an infrared cut filter and a low pass filter, be arranged between the optical system and the imaging forming surface (imaging surface) according to the structure of a camera having lenses mounted thereto. FIG. 1 shows an example in which a parallel plate optical part PP is arranged between the second lens group G2 and the imaging device 5, considering the above-mentioned structure.

The variable-power optical system changes the gap between the first lens group G1 and the second lens group G2 on the optical axis Z to change power, and moves the first lens group G1 along the optical axis Z to correct the position of the imaging surface with the change in power. When power varies from the wide angle end to the telephoto end, the first lens group G1 and the second lens group G2 are moved so as to draw the loci represented by solid arrows of FIG. 1. In addition, the variable-power optical system moves the first lens group G1 along the optical axis Z to perform focusing. The first lens group G1 also serves as a focus group.

The first lens group G1 includes a first sub lens group G11 and a second sub lens group G12 arranged in this order from the object side. The first sub lens group G11 includes at least three negative meniscus lenses, and the second sub lens group G12 includes a biconcave lens and a positive lens arranged in this order from the object side.

For example, as shown in FIG. 1, the first lens group G1 may include five single lenses, that is, three lenses L11, L12, and L13, which are negative meniscus lenses, a lens L14, which is a biconcave lens, and a lens L15, which is a positive lens, arranged in this order from the object side. In this example, the first sub lens group G11 includes the lenses L11, L12, and L13, and the second sub lens group G12 includes the lenses L14 and L15.

Since the negative meniscus lens is arranged closest to the object side in the lens system, it is easy to correct spherical aberration at the telephoto end, and it is effective to obtain a wide angle of view. In addition, the variable-power optical system according to this embodiment is characterized in that it includes at least three negative meniscus lenses. Therefore, it is possible to obtain the following effects that have not been obtained in the related art.

In the optical system disclosed in JP-A-2006-119574, one negative meniscus lens is arranged closest to the object side in the first lens group. However, since only one negative meniscus lens is provided, distortion increases with an increase in the angle of view of the optical system. In contrast, in the variable-power optical system according to this embodiment, since at least three negative meniscus lenses are arranged closest to the object side in the first lens group G1, it is possible to obtain a wide angle of view while preventing distortion.

In addition, at least one negative meniscus lens included in the first sub lens group G11 of the first lens group G1 may have at least one aspheric surface. In this case, it is possible to accurately correct all aberrations.

The second sub lens group G12 of the first lens group G1 includes a negative biconcave lens, which is shown as the lens L14 in FIG. 1. Therefore, it is easy to ensure negative power required for the first lens group G1. As a result, it is possible to effectively correct aberration while decreasing the number of lenses to reduce the size of an optical system.

Since the first lens group G1 includes a positive lens which is shown as the lens L15 in FIG. 1, the positive lens can converge a beam diverged from the object side and guide the converged beam to the positive second lens group. In addition, it is easy to keep the balance of aberration of the first lens group G1.

The second lens group G2 includes a first positive lens that is arranged closest to the object side and has at least one aspheric surface, and a second positive lens that is arranged immediately after the image side of the first positive lens.

For example, as shown in FIG. 1, the second lens group G2 includes four single lenses, that is, a lens L21, which is a biconvex positive lens, having at least one aspheric surface, a lens L22, which is a biconvex positive lens, a lens L23, which is a negative meniscus lens having a concave surface facing the image side, and a biconvex lens L24 arranged in this order from the object side.

In the second lens group G2, since the lens L21 arranged closest to the object side is an aspheric lens, it is easy to correct all aberrations of a beam passing through a peripheral portion of the lens. In particular, it is easy to correct spherical aberration occurring due to a large aperture ratio, and it is easy to ensure a large aperture ratio. If the lens L21 is a spherical lens, positive power is increased as the distance from the optical axis to a peripheral portion is increased. As a result, there is a concern that spherical aberration will be excessively corrected at the peripheral portion. In contrast, in this embodiment, the lens L21 is an aspheric lens, and the lens L21 is formed in a shape in which the positive power is decreased as the distance from the optical axis to the peripheral portion is increased, as shown in FIG. 1. In this case, it is possible to prevent spherical aberration from being excessively corrected, and thus reduce the spherical aberration. Therefore, it is easy to obtain a large aperture ratio.

In addition, since the lens L21 is an aspheric lens, it is easy to correct all aberrations other than the spherical aberration. Therefore, it is possible to easily ensure a high optical performance while reducing the size of an optical system. In particular, as shown in FIG. 1, since an object-side surface S12 and an image-side surface S13 of a biconvex lens are aspheric surfaces, it is possible to easily ensure a high aberration correcting effect while reducing the size of an optical system. The biconvex shape of the lens L21 is determined such that the object-side surface has a convex shape with a large curvature to converge a beam and the image-side surface has a convex shape to correct chromatic aberration.

As shown in FIG. 1, when all the positive lenses included in the second lens group G2 are biconvex lenses, it is easy to ensure positive power required to converge a beam diverged by the first lens group G1. Therefore, it is possible to effectively correct aberration while decreasing the number of lenses to reduce the size of an optical system.

The variable-power optical system having the above-mentioned structure can easily obtain a wide angle of view, maintain a large aperture ratio, and achieve a high optical performance capable of obtaining a high-quality image with a compact structure. For example, the variable-power optical system shown in FIG. 1 includes a total of nine lenses, that is, five lenses included in the first lens group G1 and four lenses included in the second lens group G2. Therefore, the variable-power optical system has a compact structure.

However, in the variable-power optical system according to this embodiment of the invention, the number of lenses and the shapes of the lenses are not limited to those shown in FIG. 1, but various modifications thereof can be made. For example, the variable-power optical system according to this embodiment of the invention may further include a third lens group that has a negative refractive power and is fixed when power varies on the image side of the second lens group G2. The addition of the third lens group makes it possible to change an image size and correspond to a change in the size of an imaging device. Specifically, this structure can correspond to a change in the size of the imaging device, such as a change in the size of a CCD from 6 mm to 8 mm.

The variable-power optical system according to this embodiment of the invention may further include the following preferred aspects, in addition to the above-mentioned structure, thereby obtaining a higher optical performance.

When the absolute value of the focal length of the first lens group G1 is $|f1|$ and the focal length of the entire optical system at the wide angle end is fw, it is preferable that the variable-power optical system satisfy Conditional expression 1 given below:

$$1.9 < |f1|/fw < 3.6. \quad \text{[Conditional expression 1]}$$

Conditional expression 1 relates to the ratio of the focal length of the first lens group G1 to the focal length of the entire optical system at the wide angle end, that is, the ratio of the power of the first lens group G1 to the power of the entire optical system. When the ratio is greater than the upper limit of Conditional expression 1, the negative refractive power of the first lens group G1 is reduced, and the movement of the first lens group G1 is increased as power varies, which results in an increase in the size of the optical system. When the ratio is less than the lower limit of Conditional expression 1, the negative refractive power of the first lens group G1 is increased, and the spherical aberration is not sufficiently corrected at the telephoto end.

Examples 1 to 4 disclosed in JP-A-2007-94174 do not all satisfy Conditional expression 1, and have values less than the lower limit of Conditional expression 1. In contrast, the variable-power optical system according to this embodiment satisfies Conditional expression 1. Therefore, it is possible to reduce the size of an optical system and prevent an increase in spherical aberration at the telephoto end. As a result, it is possible to obtain a high optical performance.

Further, it is preferable that the variable-power optical system satisfy the following Conditional expression 1-1 in order to obtain a high optical performance while further reducing the size of the optical system:

$2.4 < |f1|/fw < 3.2.$ [Conditional expression 1-1]

When the average of the refractive indexes of all the negative meniscus lenses in the first sub lens group G11 at the d-line is N1$m$, it is preferable that the variable-power optical system satisfy Conditional expression 2 given below:

$N1m > 1.70.$ [Conditional expression 2]

When the average is less than the lower limit of Conditional expression 2, the negative refractive power of the first lens group G1 is reduced, which results in an increase in the size of the optical system.

It is preferable that the variable-power optical system satisfy the following Conditional expression 2-1 in order to further reduce the size of the optical system:

$N1m > 1.84.$ [Conditional expression 2-1]

When the Abbe number of the positive lens included in the second sub lens group G12 at the d-line is $v2p$, it is preferable that at least one positive lens of the variable-power optical system satisfy Conditional expression 3 given below:

$v2p < 20.0.$ [Conditional expression 3]

When the Abbe number is greater than the upper limit of Conditional expression 3, chromatic aberration on the axis is increased at the telephoto end.

When the second lens group G2 includes a negative meniscus lens having a concave surface facing the image side and the refractive index of the negative meniscus lens at the d-line is N23, it is preferable that the variable-power optical system satisfy Conditional expression 4 given below:

$N23 > 1.95.$ [Conditional expression 4]

When the refractive index is less than the lower limit of Conditional expression 4, the curvature of the image-side concave surface of the negative meniscus lens is increased, which results in an increase in field curvature. Therefore, it is difficult to maintain a high optical performance in the range from the center of a screen to the periphery of the screen.

For example, when the variable-power optical system is used in a severe environment, such as outside, it is preferable that the lens arranged closest to the object side be made of a material capable of preventing the deterioration of the surface of the lens due to rain and wind and a temperature variation due to direct lays of the sun, and having high resistance to chemicals, such as oils, fats, and a detergent, that is, a material having high water resistance, high weather resistance, high acid resistance, and high chemical resistance. In addition, it is preferable that the lens be made of a hard and splinterless material. Specifically, it is preferable that the lens arranged closest to the object side be made of glass or transparent ceramics.

It is preferable that the lens having the aspheric shape be made of plastic. In this case, it is possible to accurately form an aspheric shape, and reduce the weight and manufacturing costs of an optical system.

When the variable-power optical system is required to be used in a wide temperature range, it is preferable that each lens be made of a material with a small linear expansion coefficient. In addition, when the variable-power optical system is used in a severe environment, a protective multi-layer film may be coated. In addition to the coating of the protective film, an antireflection film for reducing ghost light in use may be coated.

In the example shown in FIG. 1, the optical part PP is arranged between the lens system and the imaging surface. However, instead of providing various filters, such as a low pass filter and a filter for cutting a specific wavelength band, various filters may be provided between the lenses, or a film having the same function as various filters may be coated on the lens surface of any lens.

As described above, according to the variable-power optical system of this embodiment, it is possible to achieve a wide angle of view while maintaining a compact structure and a large aperture ratio by appropriately using the above-mentioned preferred structure according to required specifications. Therefore, it is possible to easily obtain a high-quality image corresponding to a camera including an imaging device provided with 1,000,000 pixels or more.

EXAMPLE

Next, detailed numeric examples of the variable-power optical systems according to the invention will be described.

Example 1

The cross-sectional view of lenses according to Example 1 is shown in FIG. 1. Specifically, a first lens group G1 of a variable-power optical system according to Example 1 includes meniscus-shaped negative lenses L11, L12, and L13 having convex surfaces facing the object side, a biconcave negative lens L14, and a plano-convex positive lens L15 having a convex surface facing the object side arranged in this order from the object side. The second lens group G2 includes a positive lens L21 having a biconvex shape in the vicinity of the optical axis, a biconvex positive lens L22, a meniscus-shaped negative lens L23 having a convex surface facing the object side, and a biconvex positive lens L24 arranged in this order from the object side. In the variable-power optical system according to Example 1, an object-side surface S12 and an image-side surface S13 of the lens L21 are aspheric surfaces. The position of the aperture stop St is fixed, but the diameter thereof is variable when power varies.

Lens data of the variable-power optical system according to Example 1 is shown in Table 1, aspheric data thereof is shown in Table 2, and various data is shown in Table 3. In addition, the meaning of symbols in the following Tables 1 to 3 is the same as that in the following Examples.

In the lens data of Table 1, Si indicates an i-th (i=1, 2, 3, . . . ) surface number. In this case, the surface of a component closest to the object side is given number 1, and the surface number is sequentially increased toward the image side. Ri indicates the curvature radius of the i-th surface, and Di indicates the gap between the i-th surface and an (i+1)-th surface on the optical axis Z. In addition, Ndj indicates the refractive index of a j-th (j=1, 2, 3, . . . ) optical component with respect to the d-line (wavelength: 587.6 nm). In this case, a lens arranged closest to the object side is given number 1, and the number is sequentially increased toward the image side. In addition, vdj indicates the Abbe number of the j-th optical component with respect to the d-line. The lens data also includes the aperture stop St and the optical part PP. In the lens data, when the lens surface is convex toward the object side, the curvature radius thereof has a positive value. When the lens surface is convex toward the image side, the curvature radius thereof has a negative value.

In the lens data shown in Table 1, symbol * is added to the surface number of an aspheric surface, and the curvature radius of the aspheric surface is represented by the value of a paraxial curvature radius. The aspheric data shown in Table 2 indicates aspheric coefficients related to the aspheric surfaces. The aspheric coefficients are the values of coefficients K and Bm (m=3, 4, 5, . . . ) in an aspheric surface expression represented by Expression A given below:

$$Zd = C \cdot h^2 / \{1 + (1 - K \cdot C^2 \cdot h^2)^{1/2}\} + \Sigma Bm \cdot h^m, \quad \text{[Expression A]}$$

(where Zd: the depth of an aspheric surface (the length of a perpendicular line that drops from a point on the aspheric surface at a height h to a plane vertical to the optical axis that is tangent to the top of the aspheric surface), h: height (the distance from the optical axis to a lens surface), C: the inverse number of a paraxial curvature radius, and K and Bm: aspheric coefficients (m=3, 4, 5, . . . , 20)).

In the lens data shown in Table 1, a variable spacing D1, a variable spacing D2, and a variable spacing D3 are written in surface spacing fields corresponding to the gap between the first lens group G1 and the aperture stop St, the gap between the aperture stop St and the second lens group G2, and the gap between the second lens group G2 and the optical part PP that are changed to vary power.

Various data shown in Table 3 includes the focal length of the entire optical system, an F value (Fno.), the entire angle of view, and the values of the variable spacing D1, the variable spacing D2, and the variable spacing D3 at the wide angle end and the telephoto end. In the lens data and various data, the unit of length is millimeter. However, the optical system has the same optical performance even when proportional magnification or proportional reduction is performed. Therefore, the unit of length is not limited to millimeter, but other appropriate units may be used.

TABLE 1

Example 1
Lens data

| Si | Ri | Di | Ndj | vdj |
|---|---|---|---|---|
| 1 | 21.3671 | 1.10 | 1.83481 | 42.7 |
| 2 | 10.6261 | 2.23 | | |
| 3 | 14.9132 | 0.95 | 1.88300 | 40.8 |
| 4 | 8.4452 | 2.79 | | |
| 5 | 19.7316 | 0.87 | 1.88300 | 40.8 |
| 6 | 9.7910 | 2.93 | | |
| 7 | −38.6003 | 3.74 | 1.80400 | 46.6 |
| 8 | 18.4696 | 1.37 | | |
| 9 | 20.6244 | 2.92 | 1.92286 | 18.9 |
| 10 | ∞ | Variable spacing D1 | | |
| 11 (aperture stop) | — | Variable spacing D2 | | |
| 12* | 13.2894 | 5.00 | 1.56883 | 56.3 |
| 13* | −23.0141 | 0.89 | | |
| 14 | 14.0731 | 3.79 | 1.49700 | 81.6 |
| 15 | −13.9494 | 0.10 | | |
| 16 | 41.3953 | 0.65 | 2.00069 | 25.5 |
| 17 | 7.3588 | 0.46 | | |
| 18 | 10.5646 | 3.17 | 1.51633 | 64.1 |
| 19 | −20.2979 | Variable spacing D3 | | |
| 20 | ∞ | 1.50 | 1.51633 | 64.1 |
| 21 | ∞ | | | |

TABLE 2

Example 1
Aspheric data

S12 (twelfth surface)

| K | B3 | B4 | B5 | B6 |
|---|---|---|---|---|
| 0.00000E+00 | 1.08095E−04 | −1.92549E−04 | 1.85737E−05 | −1.83773E−06 |

| B7 | B8 | B9 | B10 | B11 |
|---|---|---|---|---|
| −1.67736E−07 | −9.10310E−09 | 1.67155E−09 | −1.15204E−10 | 2.49218E−12 |

| B12 | B13 | B14 | B15 | B16 |
|---|---|---|---|---|
| 6.18458E−13 | 1.01136E−13 | 1.41690E−14 | 5.77915E−16 | 1.03866E−16 |

| B17 | B18 | B19 | B20 | |
|---|---|---|---|---|
| 8.64951E−18 | 4.26468E−19 | 3.77745E−20 | −2.04645E−20 | |

S13 (thirteenth surface)

| K | B3 | B4 | B5 | B6 |
|---|---|---|---|---|

TABLE 2-continued

Example 1
Aspheric data

| 0.00000E+00 | 1.13402E−04 | 1.25108E−04 | 9.31170E−06 | 9.77685E−07 |
|---|---|---|---|---|
| B7 | B8 | B9 | B10 | B11 |
| −6.53401E−07 | 6.56800E−08 | −1.42610E−09 | 1.16421E−10 | 1.14149E−11 |
| B12 | B13 | B14 | B15 | B16 |
| 1.17958E−12 | 1.16141E−13 | 2.07224E−14 | −2.53220E−16 | 1.86787E−16 |
| B17 | B18 | B19 | | B20 |
| 1.31494E−17 | 1.36290E−18 | 1.14002E−19 | | −7.42899E−21 |

TABLE 3

Example 1
Various data

| | Focal length | Fno. | Entire angle of view | Variable spacing D1 | Variable spacing D2 | Variable spacing D3 |
|---|---|---|---|---|---|---|
| Wide angle end | 2.21 | 1.33 | 146.3 | 14.90 | 8.24 | 3.00 |
| Telephoto end | 5.87 | 2.13 | 57.7 | 1.59 | 1.59 | 9.65 |

Example 2

Figure 2:
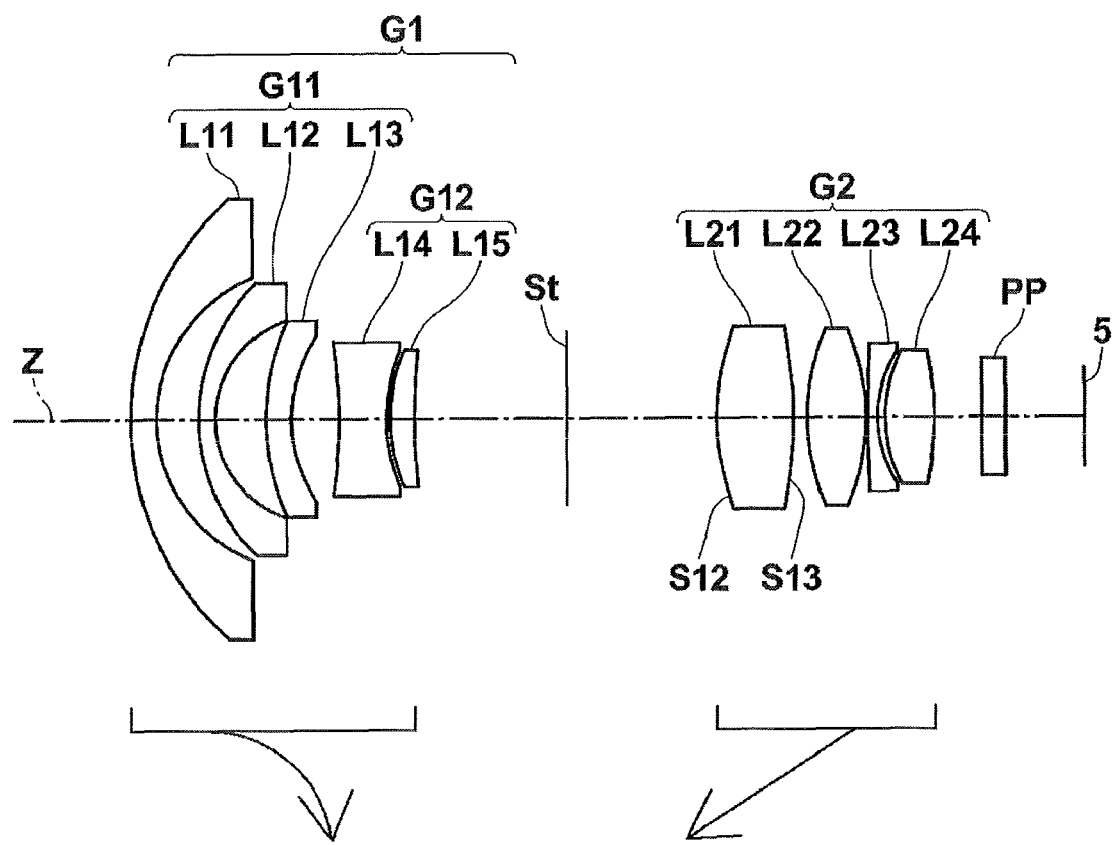
FIG. 2 is a cross-sectional view illustrating the structure of lenses of a variable-power optical system according to Example 2 of the invention.

FIG. 2 is a cross-sectional view illustrating lenses according to Example 2. The basic lens structure of a variable-power optical system according to Example 2 is similar to that according to Example 1 except that a meniscus-shaped positive lens L15 having a convex surface facing the object side is used in Example 2 instead of the plano-convex lens L15 according to Example 1. In addition, in the variable-power optical system according to Example 2, an object-side surface S12 and an image-side surface of a lens L21 are aspheric surfaces.

Lens data of the variable-power optical system according to Example 2 is shown in Table 4, aspheric data thereof is shown in Table 5, and various data thereof is shown in Table 6.

TABLE 4

Example 2
Lens data

| Si | Ri | Di | Ndj | νdj |
|---|---|---|---|---|
| 1 | 18.8544 | 1.67 | 1.88300 | 40.8 |
| 2 | 9.6898 | 2.70 | | |
| 3 | 12.0747 | 1.07 | 1.88300 | 40.8 |
| 4 | 6.6167 | 3.26 | | |
| 5 | 14.7479 | 1.64 | 1.81600 | 46.6 |
| 6 | 9.5646 | 3.03 | | |
| 7 | −31.7750 | 3.05 | 1.79952 | 42.2 |
| 8 | 11.3138 | 0.24 | | |
| 9 | 10.8296 | 1.55 | 1.92286 | 18.9 |
| 10 | 39.8198 | Variable spacing D1 | | |
| 11 (aperture stop) | — | Variable spacing D2 | | |
| 12* | 13.4759 | 4.93 | 1.56384 | 60.7 |
| 13* | −21.7202 | 0.85 | | |
| 14 | 14.0015 | 3.75 | 1.49700 | 81.6 |
| 15 | −14.6216 | 0.10 | | |
| 16 | 99.6937 | 0.65 | 2.00330 | 28.3 |
| 17 | 7.8269 | 0.50 | | |
| 18 | 9.3574 | 3.08 | 1.57135 | 53 |
| 19 | −21.9950 | Variable spacing D3 | | |
| 20 | ∞ | 1.50 | 1.51633 | 64.1 |
| 21 | ∞ | | | |

TABLE 5

Example 2
Aspheric data

S12 (twelfth surface)

| K | B3 | B4 | B5 | B6 |
|---|---|---|---|---|
| 0.00000E+00 | 1.22394E−04 | −1.89270E−04 | 1.88796E−05 | −1.80161E−06 |
| B7 | B8 | B9 | B10 | B11 |
| −1.62004E−07 | −8.18066E−09 | 1.77722E−09 | −1.02954E−10 | 3.56884E−12 |
| B12 | B13 | B14 | B15 | B16 |
| 6.97472E−13 | 1.02216E−13 | 1.34937E−14 | 5.02023E−16 | 6.25009E−17 |

TABLE 5-continued

Example 2
Aspheric data

| B17 | B18 | B19 | B20 |
|---|---|---|---|
| 1.62167E−17 | −1.16728E−18 | −1.66021E−19 | −2.47243E−20 |

S13 (thirteenth surface)

| K | B3 | B4 | B5 | B6 |
|---|---|---|---|---|
| 0.00000E+00 | 6.16264E−05 | 1.25613E−04 | 9.02996E−06 | 9.06119E−07 |

| B7 | B8 | B9 | B10 | B11 |
|---|---|---|---|---|
| −6.63016E−07 | 6.42661E−08 | −1.57622E−09 | 9.94129E−11 | 9.97829E−12 |

| B12 | B13 | B14 | B15 | B16 |
|---|---|---|---|---|
| 1.05375E−12 | 1.09930E−13 | 2.04023E−14 | −3.75122E−16 | 1.27890E−16 |

| B17 | B18 | B19 | B20 |
|---|---|---|---|
| 3.29006E−18 | 1.34527E−18 | 2.51249E−19 | −8.47282E−22 |

TABLE 6

Example 2
Various data

| | Focal length | Fno. | Entire angle of view | Variable spacing D1 | Variable spacing D2 | Variable spacing D3 |
|---|---|---|---|---|---|---|
| Wide angle end | 2.26 | 1.33 | 147.8 | 9.75 | 9.69 | 3.00 |
| Telephoto end | 6.02 | 2.59 | 56.6 | 3.76 | 1.04 | 11.65 |

Example 3

Figure 3:
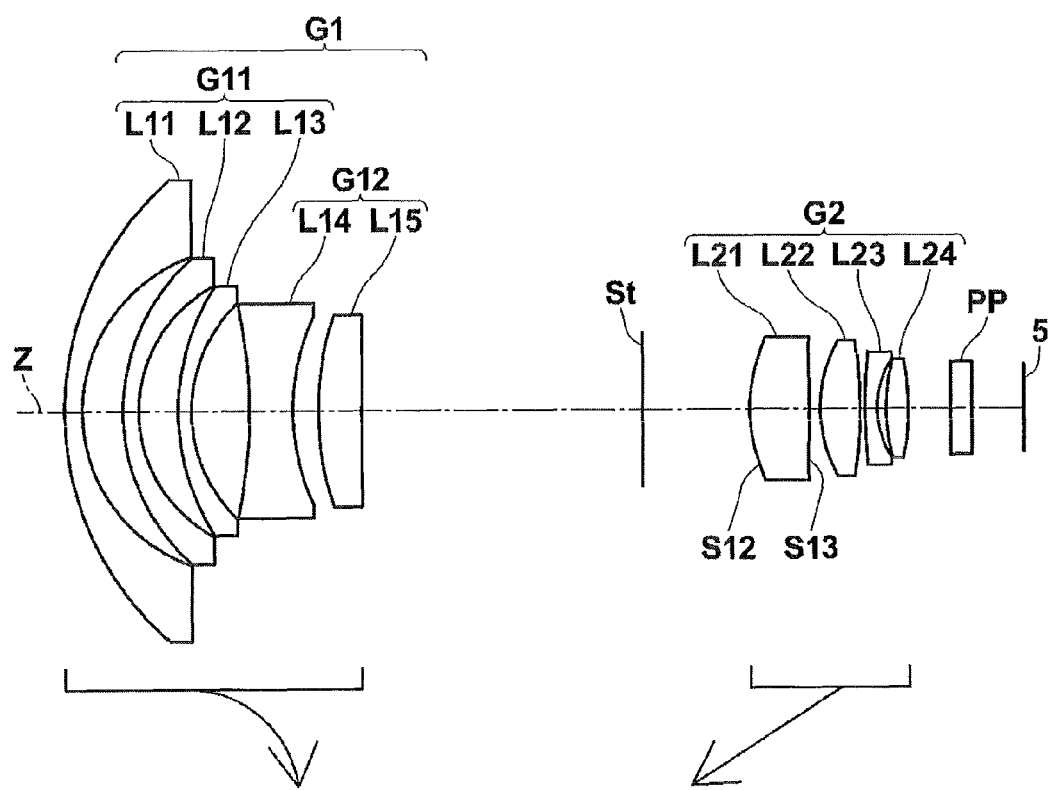
FIG. 3 is a cross-sectional view illustrating the structure of lenses of a variable-power optical system according to Example 3 of the invention.

FIG. 3 is a cross-sectional view illustrating lenses according to Example 3. The basic lens structure of a variable-power optical system according to Example 3 is the same as that according to Example 2. In addition, in the variable-power optical system according to Example 3, an object-side surface S12 and an image-side surface S13 of a lens L21 are aspheric surfaces.

Lens data of the variable-power optical system according to Example 3 is shown in Table 7, aspheric data thereof is shown in Table 8, and various data thereof is shown in Table 9.

TABLE 7

Example 3
Lens data

| Si | Ri | Di | Ndj | νdj |
|---|---|---|---|---|
| 1 | 21.8943 | 1.26 | 1.83481 | 42.7 |
| 2 | 11.7335 | 2.92 | | |
| 3 | 14.6451 | 1.10 | 1.88300 | 40.8 |
| 4 | 10.1764 | 2.84 | | |
| 5 | 16.4676 | 0.95 | 1.88300 | 40.8 |
| 6 | 10.7445 | 4.17 | | |
| 7 | −35.7810 | 3.10 | 1.80400 | 46.6 |
| 8 | 16.1017 | 1.81 | | |
| 9 | 21.6836 | 3.10 | 1.92286 | 18.9 |
| 10 | 604.6536 | Variable spacing D1 | | |
| 11 (aperture stop) | — | Variable spacing D2 | | |
| 12* | 10.7994 | 4.24 | 1.49700 | 81.6 |
| 13* | −93.9686 | 0.78 | | |
| 14 | 10.0028 | 2.86 | 1.72916 | 54.7 |
| 15 | −32.2976 | 0.32 | | |
| 16 | 36.8848 | 0.82 | 2.00069 | 25.5 |
| 17 | 6.3990 | 0.67 | | |
| 18 | 14.4120 | 1.58 | 1.61800 | 63.4 |
| 19 | −18.2038 | Variable spacing D3 | | |
| 20 | ∞ | 1.50 | 1.51633 | 64.1 |
| 21 | ∞ | | | |

TABLE 8

Example 3
Aspheric data

S12 (twelfth surface)

| K | B3 | B4 | B5 | B6 |
|---|---|---|---|---|
| 0.00000E+00 | 1.42339E−04 | −1.92648E−04 | 1.79668E−05 | −1.96683E−06 |

| B7 | B8 | B9 | B10 | B11 |
|---|---|---|---|---|

TABLE 8-continued

Example 3
Aspheric data

| −1.81872E−07 | −1.07471E−08 | 1.52696E−09 | −1.29680E−10 | 1.29811E−12 |
|---|---|---|---|---|
| B12 | B13 | B14 | B15 | B16 |
| 5.02428E−13 | 9.27482E−14 | 1.33641E−14 | 4.68051E−16 | 1.75699E−17 |
| B17 | B18 | B19 | B20 | |
| 1.52034E−17 | 6.55289E−19 | 8.24566E−20 | −2.58498E−20 | |

S13 (thirteenth surface)

| K | B3 | B4 | B5 | B6 |
|---|---|---|---|---|
| 0.00000E+00 | 1.78558E−04 | 1.25369E−04 | 9.28153E−06 | 1.01005E−06 |
| B7 | B8 | B9 | B10 | B11 |
| −6.48018E−07 | 6.65048E−08 | −1.33908E−09 | 1.26638E−10 | 1.23257E−11 |
| B12 | B13 | B14 | B15 | B16 |
| 1.27699E−12 | 1.19744E−13 | 2.31475E−14 | −5.37227E−16 | 2.52236E−16 |
| B17 | B18 | B19 | B20 | |
| 3.02821E−18 | 1.08655E−18 | 1.24629E−19 | −8.39075E−21 | |

TABLE 9

Example 3
Various data

| | Focal length | Fno. | Entire angle of view | Variable spacing D1 | Variable spacing D2 | Variable spacing D3 |
|---|---|---|---|---|---|---|
| Wide angle end | 2.21 | 1.33 | 146.2 | 20.13 | 7.64 | 3.00 |
| Telephoto end | 5.87 | 1.95 | 57.3 | 1.40 | 2.61 | 8.03 |

Example 4

Figure 4:
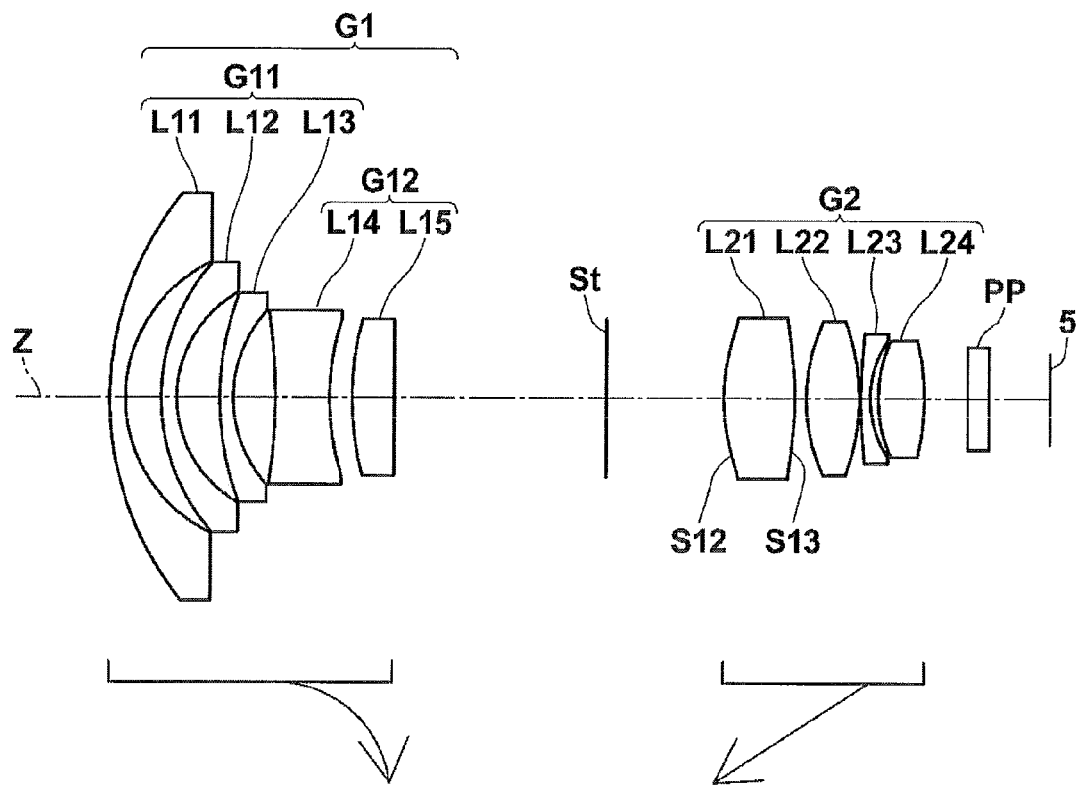
FIG. 4 is a cross-sectional view illustrating the structure of lenses of a variable-power optical system according to Example 4 of the invention.

FIG. 4 is a cross-sectional view illustrating lenses according to Example 4. The basic lens structure of a variable-power optical system according to Example 4 is the same as that according to Example 2. In addition, in the variable-power optical system according to Example 4, an object-side surface S12 and an image-side surface S13 of a lens L21 are aspheric surfaces.

Lens data of the variable-power optical system according to Example 4 is shown in Table 10, aspheric data thereof is shown in Table 11, and various data thereof is shown in Table 12.

TABLE 10

Example 4
Lens data

| Si | Ri | Di | Ndj | νdj |
|---|---|---|---|---|
| 1 | 22.6668 | 1.10 | 1.74320 | 49.3 |
| 2 | 10.5107 | 2.50 | | |
| 3 | 14.2655 | 1.10 | 1.72916 | 54.7 |
| 4 | 8.4469 | 3.01 | | |
| 5 | 20.6186 | 0.96 | 1.75500 | 52.3 |
| 6 | 9.0955 | 2.97 | | |
| 7 | −39.4534 | 3.81 | 1.88300 | 40.8 |
| 8 | 18.7657 | 1.56 | | |
| 9 | 21.0326 | 2.94 | 1.92286 | 18.9 |
| 10 | 593.0192 | Variable spacing D1 | | |
| 11 (aperture stop) | — | Variable spacing D2 | | |
| 12* | 13.1879 | 5.00 | 1.51633 | 64.1 |
| 13* | −22.8785 | 0.81 | | |
| 14 | 12.8396 | 3.71 | 1.49700 | 81.6 |
| 15 | −15.3298 | 0.10 | | |
| 16 | 38.9170 | 0.65 | 2.00330 | 28.3 |
| 17 | 7.6036 | 0.54 | | |
| 18 | 10.7694 | 3.18 | 1.48749 | 70.2 |
| 19 | −16.9744 | Variable spacing D3 | | |
| 20 | ∞ | 1.50 | 1.51633 | 64.1 |
| 21 | ∞ | | | |

TABLE 11

Example 4
Aspheric data

S12 (twelfth surface)

| K | B3 | B4 | B5 | B6 |
|---|---|---|---|---|
| 0.00000E+00 | 1.16876E−04 | −1.96860E−04 | 1.82714E−05 | −1.84730E−06 |

| B7 | B8 | B9 | B10 | B11 |
|---|---|---|---|---|
| −1.66369E−07 | −8.74938E−09 | 1.71948E−09 | −1.08203E−10 | 3.23459E−12 |

| B12 | B13 | B14 | B15 | B16 |
|---|---|---|---|---|
| 7.10596E−13 | 1.10558E−13 | 1.52918E−14 | 7.10077E−16 | 9.63697E−17 |

| B17 | B18 | B19 | B20 |
|---|---|---|---|
| 8.17578E−18 | 8.37191E−21 | 3.43247E−20 | −1.87125E−20 |

S13 (thirteenth surface)

| K | B3 | B4 | B5 | B6 |
|---|---|---|---|---|
| 0.00000E+00 | 1.25697E−04 | 1.29797E−04 | 9.51603E−06 | 9.77232E−07 |

| B7 | B8 | B9 | B10 | B11 |
|---|---|---|---|---|
| −6.55098E−07 | 6.53666E−08 | −1.46105E−09 | 1.11890E−10 | 1.09550E−11 |

| B12 | B13 | B14 | B15 | B16 |
|---|---|---|---|---|
| 1.12103E−12 | 1.10930E−13 | 1.97343E−14 | −4.55564E−16 | 1.85969E−16 |

| B17 | B18 | B19 | B20 |
|---|---|---|---|
| 1.83389E−17 | 1.39513E−18 | 2.26193E−19 | −6.26961E−21 |

TABLE 12

Example 4
Various data

| | Focal length | Fno. | Angle of view | Variable spacing D1 | Variable spacing D2 | Variable spacing D3 |
|---|---|---|---|---|---|---|
| Wide angle end | 2.20 | 1.33 | 146.2 | 14.94 | 8.26 | 3.00 |
| Telephoto end | 5.86 | 2.09 | 57.8 | 1.94 | 1.35 | 9.91 |

Example 5

Figure 5:
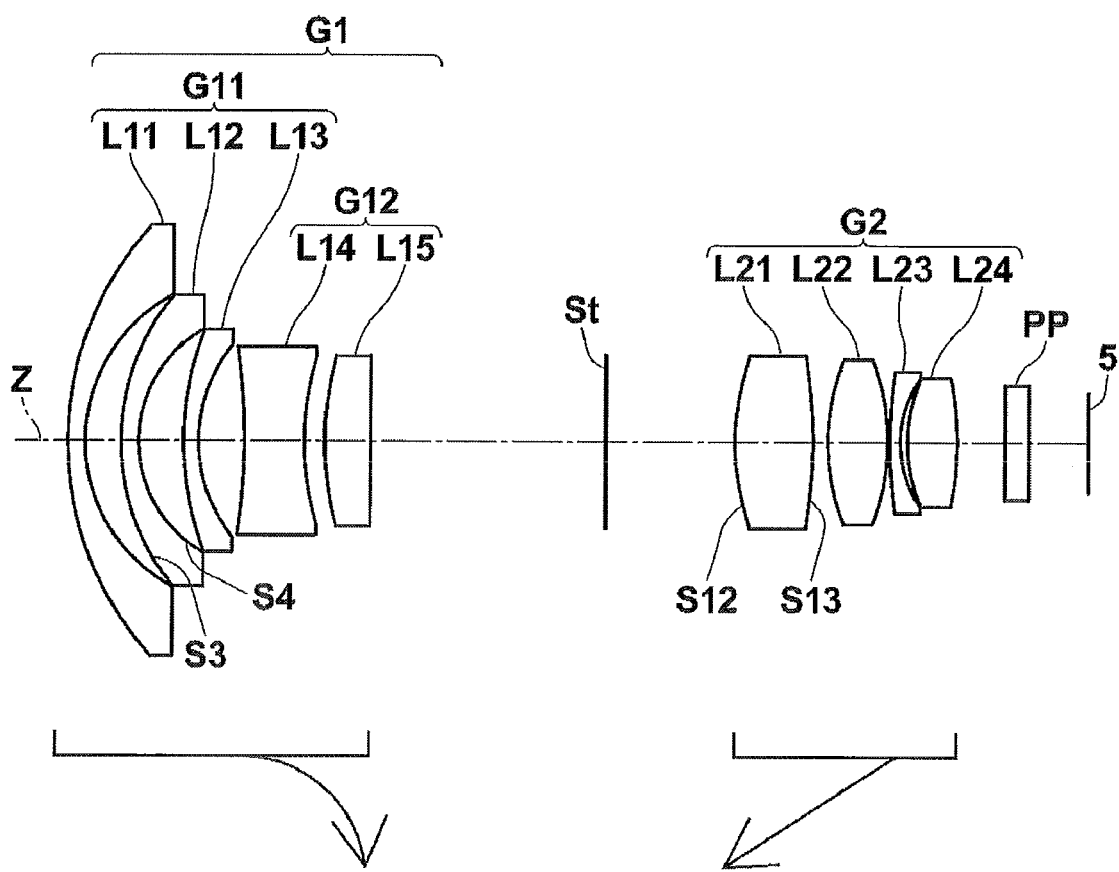
FIG. 5 is a cross-sectional view illustrating the structure of lenses of a variable-power optical system according to Example 5 of the invention.

FIG. 5 is a cross-sectional view illustrating lenses according to Example 5. The basic lens structure of a variable-power optical system according to Example 5 is similar to that according to Example 1 except that a biconvex positive lens L15 is used in Example 5 instead of the plano-convex lens L15 according to Example 1. In addition, in the variable-power optical system according to Example 5, an object-side surface S3 and an image-side surface S4 of a lens L12, and an object-side surface S12 and an image-side surface S13 of a lens L21 are aspheric surfaces.

Lens data of the variable-power optical system according to Example 5 is shown in Table 13, aspheric data thereof is shown in Table 14, and various data thereof is shown in Table 15.

TABLE 13

Example 5
Lens data

| Si | Ri | Di | Ndj | νdj |
|---|---|---|---|---|
| 1 | 20.1765 | 1.10 | 1.83481 | 42.7 |
| 2 | 10.4650 | 2.28 | | |
| 3* | 14.7312 | 1.11 | 1.88300 | 40.8 |
| 4* | 8.1241 | 2.85 | | |
| 5 | 19.4521 | 0.95 | 1.88300 | 40.8 |
| 6 | 9.6912 | 2.92 | | |
| 7 | −39.6839 | 3.76 | 1.80400 | 46.6 |
| 8 | 17.9064 | 1.34 | | |
| 9 | 20.2777 | 2.93 | 1.92286 | 18.9 |
| 10 | −1980.4893 | Variable spacing D1 | | |
| 11 (aperture stop) | — | Variable spacing D2 | | |
| 12* | 13.7193 | 5.00 | 1.56384 | 60.7 |
| 13* | −23.9587 | 0.92 | | |
| 14 | 13.9038 | 3.80 | 1.49700 | 81.6 |
| 15 | −14.3098 | 0.10 | | |
| 16 | 30.4983 | 0.65 | 2.00069 | 25.5 |
| 17 | 7.3508 | 0.45 | | |
| 18 | 10.6952 | 3.14 | 1.48749 | 70.2 |
| 19 | −19.6277 | Variable spacing D3 | | |
| 20 | ∞ | 1.50 | 1.51633 | 64.1 |
| 21 | ∞ | | | |

TABLE 14

Example 5
Aspheric data

S3 (third surface)

| K | B3 | B4 | B5 | B6 |
|---|---|---|---|---|
| 1.00000E+00 | 1.25479E−05 | 2.63261E−06 | 2.98723E−07 | 3.51345E−08 |

| B7 | B8 | B9 | B10 | B11 |
|---|---|---|---|---|
| 2.93760E−09 | 2.63735E−10 | 1.59042E−11 | 8.96750E−13 | 1.42999E−14 |

| B12 | B13 | B14 | B15 | B16 |
|---|---|---|---|---|
| −2.62719E−15 | −8.72492E−17 | 1.15866E−16 | 1.06375E−18 | 4.99750E−18 |

| B17 | B18 | B19 | B20 |
|---|---|---|---|
| 1.69493E−18 | −7.63607E−20 | 1.88484E−21 | −1.76211E−21 |

S4 (fourth surface)

| K | B3 | B4 | B5 | B6 |
|---|---|---|---|---|
| 1.00000E+00 | −5.51292E−06 | −1.25074E−06 | −1.28714E−07 | −1.28303E−08 |

| B7 | B8 | B9 | B10 | B11 |
|---|---|---|---|---|
| −8.75487E−10 | −5.72206E−11 | −9.54933E−13 | 3.77160E−13 | 7.47451E−14 |

| B12 | B13 | B14 | B15 | B16 |
|---|---|---|---|---|
| 1.20874E−14 | 1.48614E−15 | 1.75368E−16 | 1.32086E−17 | 4.24735E−18 |

| B17 | B18 | B19 | B20 |
|---|---|---|---|
| 7.81487E−19 | −3.52864E−19 | −2.14844E−20 | −6.31658E−22 |

S12 (twelfth surface)

| K | B3 | B4 | B5 | B6 |
|---|---|---|---|---|
| 0.00000E+00 | 1.11889E−04 | −1.93702E−04 | 1.84727E−05 | −1.84079E−06 |

| B7 | B8 | B9 | B10 | B11 |
|---|---|---|---|---|
| −1.67209E−07 | −8.96922E−09 | 1.68936E−09 | −1.12686E−10 | 2.75765E−12 |

| B12 | B13 | B14 | B15 | B16 |
|---|---|---|---|---|
| 6.50917E−13 | 1.04257E−13 | 1.45299E−14 | 5.90089E−16 | 1.04034E−16 |

| B17 | B18 | B19 | B20 |
|---|---|---|---|
| 8.38415E−18 | 3.41338E−19 | 5.36328E−20 | −2.00175E−20 |

S13 (thirteenth surface)

| K | B3 | B4 | B5 | B6 |
|---|---|---|---|---|
| 0.00000E+00 | 1.15043E−04 | 1.26074E−04 | 9.41671E−06 | 9.82025E−07 |

| B7 | B8 | B9 | B10 | B11 |
|---|---|---|---|---|
| −6.53865E−07 | 6.55345E−08 | −1.44622E−09 | 1.13618E−10 | 1.11189E−11 |

| B12 | B13 | B14 | B15 | B16 |
|---|---|---|---|---|
| 1.14405E−12 | 1.12814E−13 | 2.03552E−14 | −2.89827E−16 | 1.78906E−16 |

| B17 | B18 | B19 | B20 |
|---|---|---|---|
| 1.33286E−17 | 1.37166E−18 | 1.15638E−19 | −8.92651E−21 |

TABLE 15

Example 5
Various data

| | Focal length | Fno. | Angle of view | Variable spacing D1 | Variable spacing D2 | Variable spacing D3 |
|---|---|---|---|---|---|---|
| Wide angle end | 2.16 | 1.33 | 144.1 | 14.92 | 8.23 | 3.00 |
| Telephoto end | 5.75 | 2.11 | 58.6 | 1.40 | 1.67 | 9.56 |

Example 6

Figure 6:
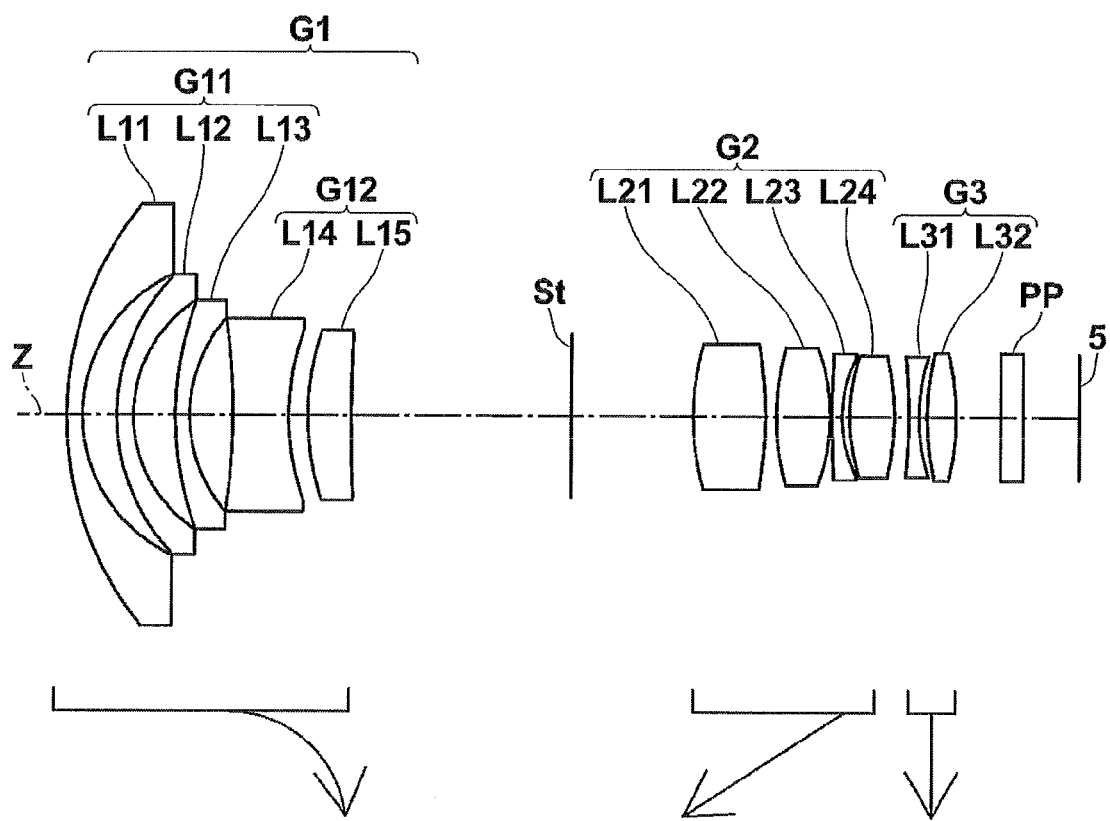
FIG. 6 is a cross-sectional view illustrating the structure of lenses of a variable-power optical system according to Example 6 of the invention.

FIG. 6 is a cross-sectional view illustrating lenses according to Example 6. A variable-power optical system according to Example 6 includes a first lens group G1, an aperture stop St, a second lens group G2, and a third lens group G3. The basis lens structures of the first lens group G1 and the second lens group G2 of the variable-power optical system according to Example 6 are the same as those according to Example 2. The third lens group G3 of the variable-power optical system according to Example 6 is a fixed lens group that has a negative refractive power and does not move when power varies. The third lens group G3 includes two lenses, that is, a biconcave negative lens L31 and a biconvex positive lens L32. In Example 6, a variable spacing D3 is the gap between the second lens group G2 and the third lens group G3, unlike the above-mentioned Examples. In the variable-power optical system according to Example 6, an object-side surface S12 and an image-side surface S13 of a lens L21 are aspheric surfaces.

Lens data of the variable-power optical system according to Example 6 is shown in Table 16, aspheric data thereof is shown in Table 17, and various data thereof is shown in Table 18.

TABLE 16

Example 6
Lens data

| Si | Ri | Di | Ndj | νdj |
|---|---|---|---|---|
| 1 | 22.3555 | 1.10 | 1.77250 | 49.6 |
| 2 | 10.3707 | 2.32 | | |
| 3 | 13.5408 | 1.11 | 1.80610 | 40.9 |
| 4 | 9.2119 | 2.84 | | |
| 5 | 22.0033 | 0.95 | 1.83481 | 42.7 |
| 6 | 9.8981 | 2.95 | | |
| 7 | −43.7206 | 3.74 | 1.80400 | 46.6 |
| 8 | 16.8156 | 1.29 | | |
| 9 | 17.5091 | 2.93 | 1.92286 | 18.9 |
| 10 | 119.6821 | Variable spacing D1 | | |
| 11 (aperture stop) | — | Variable spacing D2 | | |
| 12* | 15.5208 | 4.91 | 1.62230 | 53.2 |
| 13* | −23.0179 | 0.73 | | |
| 14 | 17.4185 | 3.65 | 1.49700 | 81.6 |
| 15 | −12.9384 | 0.10 | | |
| 16 | 68.4022 | 0.66 | 2.00069 | 25.5 |
| 17 | 8.7393 | 0.50 | | |
| 18 | 13.1033 | 3.00 | 1.48749 | 70.2 |
| 19 | −18.1878 | Variable spacing D3 | | |
| 20 | −39.7756 | 0.60 | 1.83400 | 37.2 |
| 21 | 12.6481 | 0.58 | | |
| 22 | 19.6969 | 1.94 | 1.72825 | 28.5 |
| 23 | −18.5569 | 1.00 | | |
| 24 | ∞ | 1.50 | 1.51633 | 64.1 |
| 25 | ∞ | | | |

TABLE 17

Example 6
Aspheric data

S12 (twelfth surface)

| K | B3 | B4 | B5 | B6 |
|---|---|---|---|---|
| 0.00000E+00 | 1.27635E−04 | −1.91886E−04 | 1.86163E−05 | −1.82308E−06 |

| B7 | B8 | B9 | B10 | B11 |
|---|---|---|---|---|
| −1.65910E−07 | −8.87062E−09 | 1.69405E−09 | −1.12796E−10 | 2.73575E−12 |

| B12 | B13 | B14 | B15 | B16 |
|---|---|---|---|---|
| 6.54279E−13 | 1.04944E−13 | 1.48198E−14 | 7.89654E−16 | 1.21896E−16 |

| B17 | B18 | B19 | B20 |
|---|---|---|---|
| 9.18565E−18 | 6.70802E−19 | 9.24759E−20 | −2.56006E−20 |

S13 (thirteenth surface)

| K | B3 | B4 | B5 | B6 |
|---|---|---|---|---|
| 0.00000E+00 | 1.12348E−04 | 1.24777E−04 | 9.34471E−06 | 9.78904E−07 |

| B7 | B8 | B9 | B10 | B11 |
|---|---|---|---|---|

TABLE 17-continued

Example 6
Aspheric data

| | | | | |
|---|---|---|---|---|
| −6.54142E−07 | 6.55343E−08 | −1.44394E−09 | 1.14030E−10 | 1.11794E−11 |
| B12 | B13 | B14 | B15 | B16 |
| 1.15291E−12 | 1.16181E−13 | 2.02734E−14 | −2.69148E−16 | 2.25854E−16 |
| B17 | B18 | B19 | B20 | |
| 1.41335E−17 | 1.51171E−18 | 7.19957E−20 | 4.89494E−22 | |

TABLE 18

Example 6
Various data

| | Focal length | Fno. | Angle of view | Variable spacing D1 | Variable spacing D2 | Variable spacing D3 |
|---|---|---|---|---|---|---|
| Wide angle end | 2.89 | 1.78 | 144.7 | 14.90 | 8.21 | 1.00 |
| Telephoto end | 7.68 | 2.97 | 57.6 | 2.52 | 1.01 | 8.20 |

Table 19 shows values corresponding to Conditional expressions 1 to 4 in Examples 1 to 6. As can be seen from Table 19, Examples 1 to 6 all satisfy Conditional expressions 1 to 4.

TABLE 19

| | Example 1 | Example 2 | Example 3 | Example 4 | Example 5 | Example 6 |
|---|---|---|---|---|---|---|
| Conditional expression 1 \|f1\|/fw | 2.8 | 2.1 | 3.5 | 2.8 | 2.9 | 2.3 |
| Conditional expression 2 N1m | 1.87 | 1.86 | 1.87 | 1.74 | 1.87 | 1.80 |
| Conditional expression 3 v2p | 18.9 | 18.9 | 18.9 | 18.9 | 18.9 | 18.9 |
| Conditional expression 4 N23 | 2.00 | 2.00 | 2.00 | 2.00 | 2.00 | 2.00 |

Figure 7A:
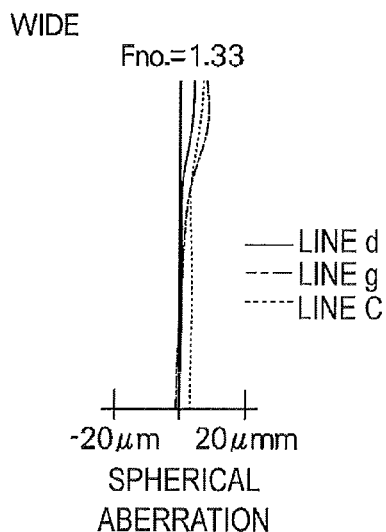
FIGS. 7A to 7F are diagrams illustrating aberrations of the variable-power optical system according to Example 1 of the invention.
Figure 7B:
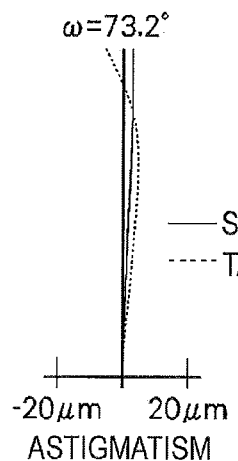
Figure 7C:
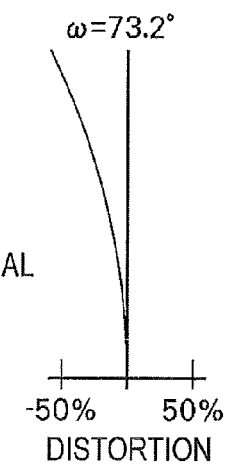
Figure 7D:
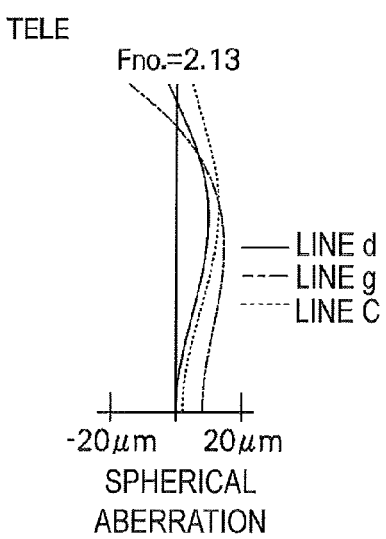
Figure 7E:
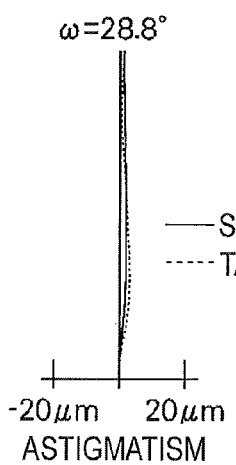
Figure 7F:
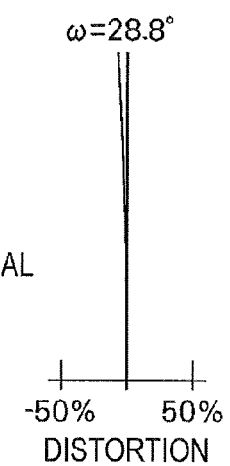
Figure 8A:
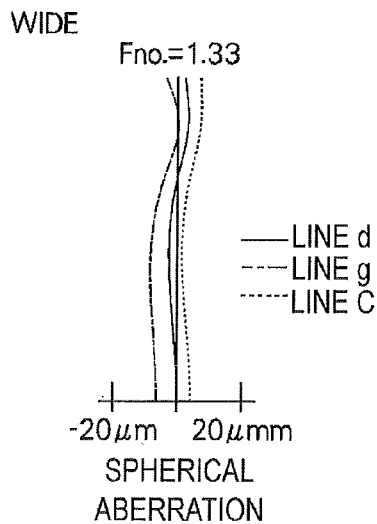
FIGS. 8A to 8F are diagrams illustrating aberrations of the variable-power optical system according to Example 2 of the invention.
Figure 8B:
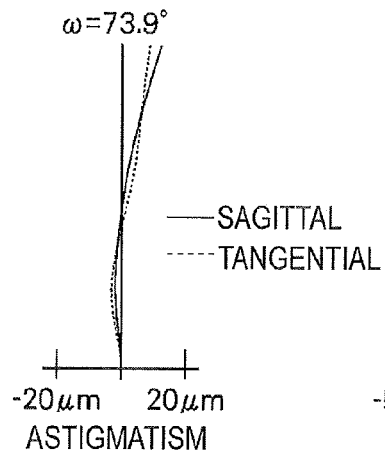
Figure 8C:
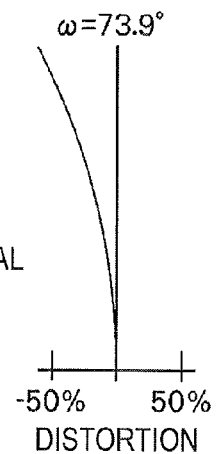
Figure 8D:
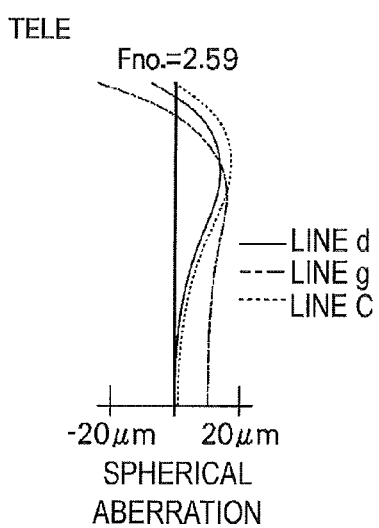
Figure 8E:
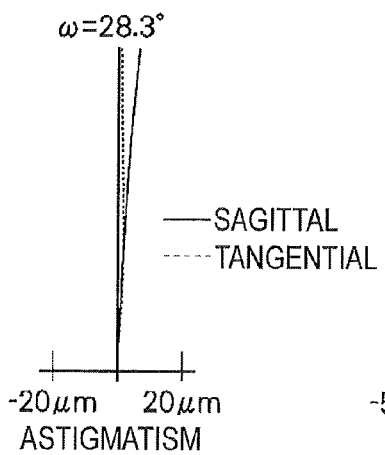
Figure 8F:
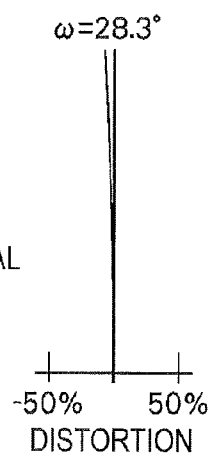
Figure 10A:
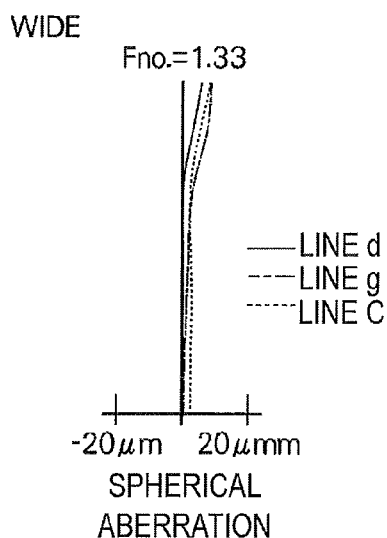
FIGS. 10A to 10F are diagrams illustrating aberrations of the variable-power optical system according to Example 4 of the invention.
Figure 10B:
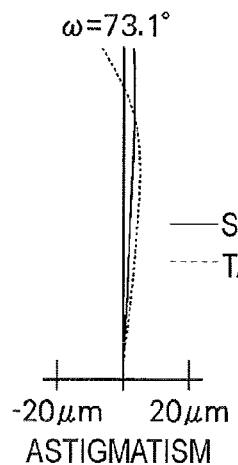
Figure 10C:
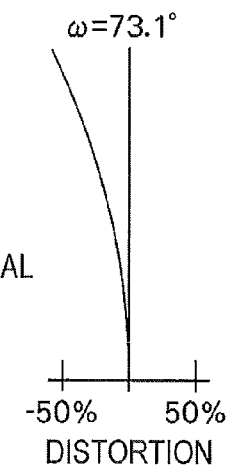
Figure 10D:
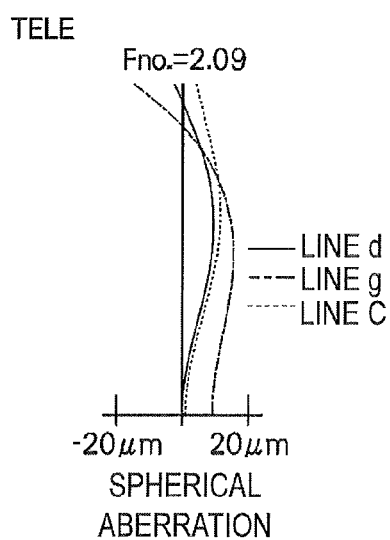
Figure 10E:
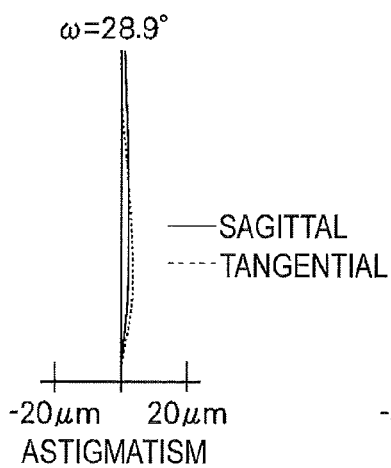
Figure 10F:
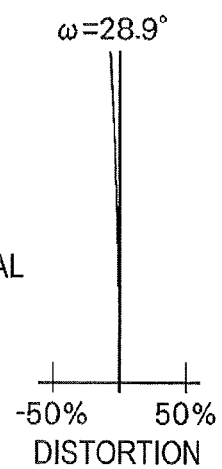
Figure 12A:
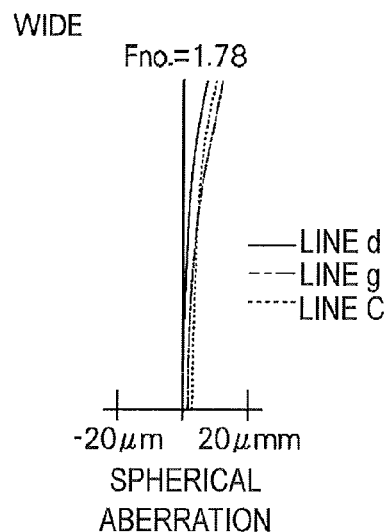
FIGS. 12A to 12F are diagrams illustrating aberrations of the variable-power optical system according to Example 6 of the invention.
Figure 12B:
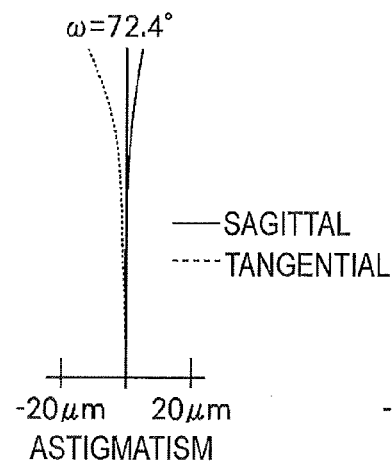
Figure 12C:
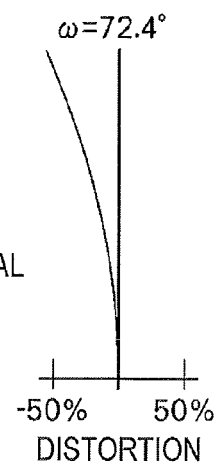
Figure 12D:
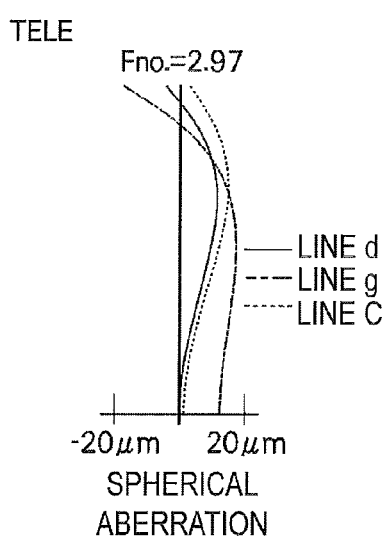
Figure 12E:
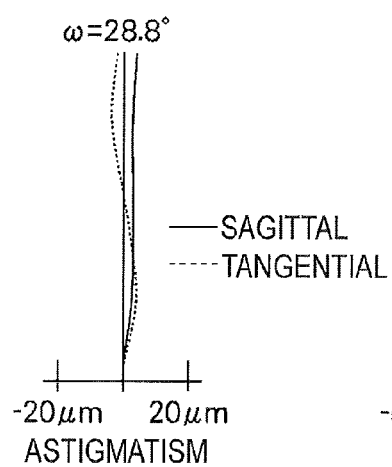
Figure 12F:
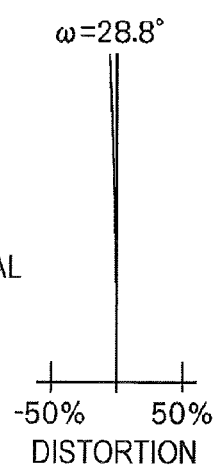

FIGS. 7A to 7C are aberration diagrams illustrating spherical aberration, astigmatism, and distortion of the variable-power optical system according to Example 1 at the wide angle end. FIGS. 7D to 7F are aberration diagrams illustrating spherical aberration, astigmatism, and distortion of the variable-power optical system according to Example 1 at the telephoto end. Each of the aberration diagrams shows aberration using the d-line as a reference wavelength, and the spherical aberration diagram shows aberration with respect to the g-line (wavelength: 436 nm) and the C-line (wavelength: 656.3 nm). In the spherical aberration diagram, Fno. means the F value. In the astigmatism diagram and the distortion diagram, ο means a half angle of view. Similarly, FIGS. 8A to 8F, FIGS. 9A to 9F, FIGS. 10A to 10F, FIGS. 11A to 11F, and FIGS. 12A to 12F are diagrams illustrating the aberrations of the variable-power optical systems according to Example 2, Example 3, Example 4, Example 5, and Example 6, respectively.

As can be seen from the above-mentioned data, in Examples 1 to 6, the variable-power optical system having a variable power ratio of about 2.7 has a small structure, and the F value at the wide angle end is in the range of 1.33 to 1.78. That is, a fast lens system having a large aperture ratio is obtained. In addition, the variable-power optical system has the entire angle of view in the range of 144° to 148°, which is a wide range, at the wide angle end, accurately corrects each aberration, and has a high optical performance in the visible range both at the wide angle end and the telephoto end.

Figure 13:
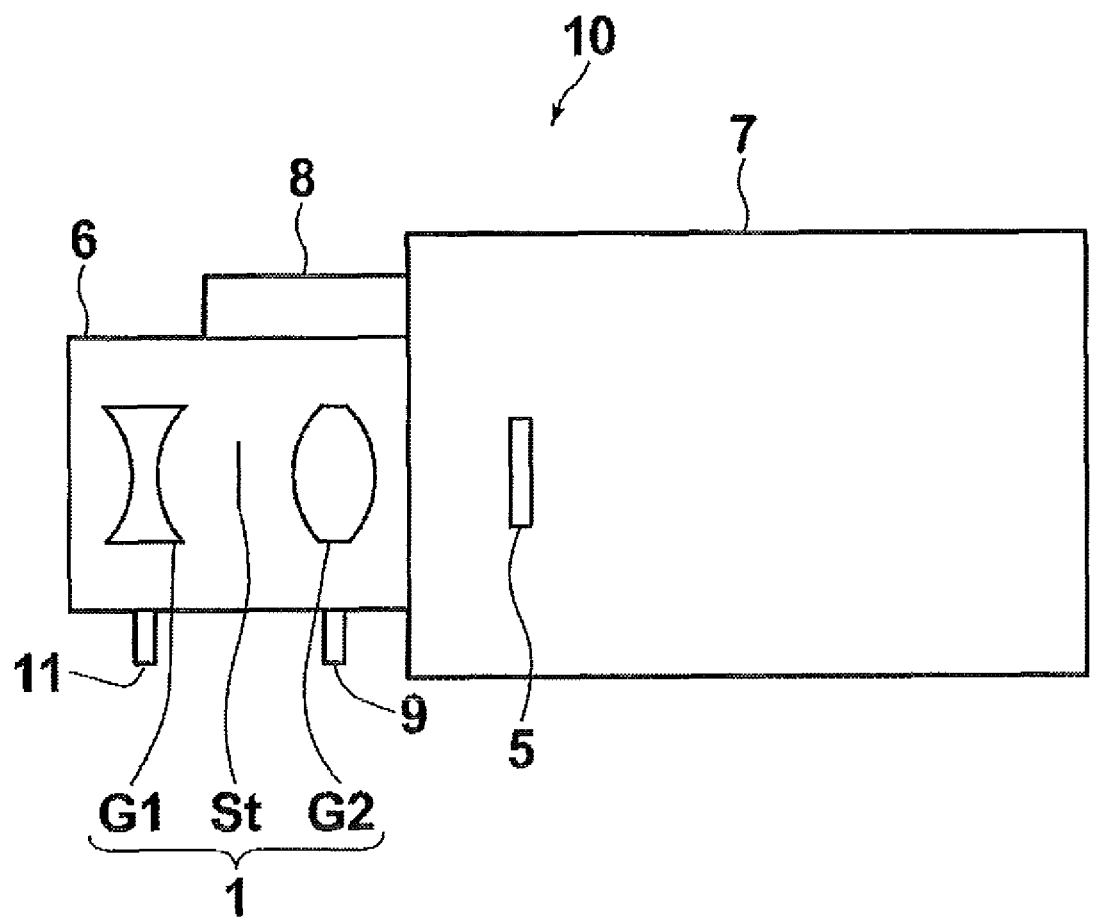
FIG. 13 is a cross-sectional view schematically illustrating an imaging apparatus according to an embodiment of the invention.

FIG. 13 is a diagram schematically illustrating the structure of a monitoring camera according to another embodiment of the invention, which is provided with the variable-power optical system according to the embodiment of the invention. A monitoring camera 10 shown in FIG. 13 includes a lens device 6 and a camera body 7. A variable-power optical system 1 is provided in the lens device 6. FIG. 13 schematically illustrates the variable-power optical system 1 including the first lens group G1, the aperture stop St, and the second lens group G2.

In addition, the imaging device 5 that captures the image of a subject formed by the variable-power optical system 1 is provided in the camera body 7. Examples of the imaging device 5 may include a CCD (charge coupled device) that converts an optical image formed by the variable-power optical system into electric signals and a CMOS (complementary metal oxide semiconductor). The imaging device 5 is arranged such that its imaging surface is aligned with the imaging surface of the variable-power optical system 1.

An aperture diaphragm mechanism 8 that changes the diameter of the aperture stop St is provided above the lens device 6. A zoom knob 9 for changing the power of the variable-power optical system 1 and a focus knob 11 for adjusting the focus of the variable-power optical system 1 are provided below the lens device 6.

Since the variable-power optical system 1 according to the embodiment of the invention has the above-mentioned advantages, the imaging apparatus according to this embodiment can have a small size and capture a high-quality image in a wide range even under low-brightness imaging conditions.

Although the embodiments and examples of the invention have been described above, the invention is not limited thereto. Various modifications and changes of the invention can be made without departing from the scope and spirit of the invention. For example, the curvature radius, the surface spacing, the refractive index, and the Abbe number of each lens component are not limited to the values described in the above-mentioned numerical examples, but they may have other values.

In the above-described embodiment, the monitoring camera is given as an example of the imaging apparatus, but the invention is not limited thereto. For example, the invention can be applied to other imaging apparatuses, such as a television camera, a video camera, and an electronic still camera.

What is claimed is:

1. A variable-power optical system comprising:

a first lens group having a negative refractive power;

a stop; and a second lens group having a positive refractive power, wherein the first lens group, the stop, and the second lens group are arranged in this order from an object side, a gap between the first lens group and the second lens group on an optical axis is changed to vary power, the first lens group is moved along the optical axis to correct the position of an imaging surface due to the variation in power, the first lens group includes a first sub lens group having three negative meniscus lenses and a second sub lens group having a biconcave lens and a positive lens arranged in this order from the object side, the second lens group includes a first positive lens that is arranged closest to the object side and has at least one aspheric surface and a second positive lens that is arranged immediately after the image side of the first positive lens, and when the absolute value of the focal length of the first lens group is $|f1|$ and the focal length of the entire system at a wide angle end is $fw$, the variable-power optical system satisfies Conditional expression 1 given below:

$1.9 < |f1|/fw < 3.6.$  [Conditional expression 1]

2. The variable-power optical system according to claim 1, wherein, when the average of the refractive indexes of all the negative meniscus lenses included in the first sub lens group at a d-line is $N1m$, the variable-power optical system satisfies Conditional expression 2 given below:

$N1m > 1.70.$  [Conditional expression 2]

3. The variable-power optical system according to claim 1, wherein, when the Abbe number of the positive lens included in the second sub lens group at the d-line is $\nu 2p$, at least one of the positive lenses satisfies Conditional expression 3 given below:

$\nu 2p < 20.0.$  [Conditional expression 3]

4. The variable-power optical system according to claim 1, wherein the first lens group includes five single lenses, that is, three negative meniscus lenses, a biconcave lens, and a positive lens arranged in this order from the object side.

5. The variable-power optical system according to claim 1, wherein the second lens group includes four lenses, that is, the first positive lens, which is a biconvex lens, the second positive lens, which is a biconvex lens, a negative meniscus lens having a concave surface facing an image side, and a biconvex lens arranged in this order from the object side.

6. The variable-power optical system according to claim 5, wherein, when the refractive index of the negative meniscus lens of the second lens group at the d-line is $N23$, the variable-power optical system satisfies Conditional expression 4 given below:

$N23 > 1.95.$  [Conditional expression 4]

7. The variable-power optical system according to claim 1, further comprising:

a third lens group that has a negative refractive power, is provided on the image side of the second lens group, and is fixed when power varies.

8. The variable-power optical system according to claim 1, wherein at least one of the negative meniscus lenses included in the first sub lens group has at least one aspheric surface.

9. An imaging apparatus comprising the variable-power optical system according to claim 1.

* * * * *